United States Patent
Yamaguchi et al.

(10) Patent No.: US 6,868,679 B2
(45) Date of Patent: Mar. 22, 2005

(54) EJECTOR CYCLE SYSTEM

(75) Inventors: Motohiro Yamaguchi, Hoi-gun (JP); Hiromi Ohta, Okazaki (JP); Yukimasa Sato, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/721,656

(22) Filed: Nov. 25, 2003

(65) Prior Publication Data

US 2004/0103685 A1 Jun. 3, 2004

(30) Foreign Application Priority Data

Nov. 28, 2002 (JP) ........................................ 2002-345341

(51) Int. Cl.[7] .......................... F25D 21/06; F25B 29/00; F25B 1/06
(52) U.S. Cl. .......................... 62/151; 62/159; 62/197; 62/500
(58) Field of Search ........................... 62/159, 196.4, 62/197, 500

(56) References Cited

U.S. PATENT DOCUMENTS

| | | | |
|---|---|---|---|
| 3,134,241 A | * | 5/1964 | Johnson ....................... 62/196.4 |
| 3,670,519 A | * | 6/1972 | Newton ....................... 62/116 |
| 6,178,761 B1 | | 1/2001 | Karl |
| 6,279,331 B1 | * | 8/2001 | Hirota ......................... 62/117 |
| 6,584,794 B2 | | 7/2003 | Takeuchi et al. |
| 6,606,873 B2 | | 8/2003 | Takeuchi |
| 6,698,221 B1 | * | 3/2004 | You ........................... 62/196.4 |

FOREIGN PATENT DOCUMENTS

| | | | | |
|---|---|---|---|---|
| JP | 54131156 A | * | 10/1979 | ............. F25B/1/00 |
| JP | 5-149652 | | 6/1993 | |
| JP | 10197077 A | * | 7/1998 | ............. F25B/1/00 |
| JP | 2003090635 A | * | 3/2003 | ............. F25B/1/00 |

* cited by examiner

*Primary Examiner*—Marc Norman
(74) *Attorney, Agent, or Firm*—Harness, Dickey & Pierce, PLC

(57) ABSTRACT

In a hot gas heating mode of an ejector cycle system, hot gas refrigerant discharged from a compressor is introduced to an interior heat exchanger while bypassing an exterior heat exchanger. The refrigerant discharged from the interior heat exchanger can flow into an ejector from at least an inlet of a nozzle of the ejector, and flows into the gas-liquid separator, in the heating mode. Alternatively, refrigerant discharged from the compressor can be supplied to the interior heat exchanger through a clearance between an outer wall of the nozzle and an inner wall of a nozzle housing portion, while bypassing the exterior heat exchanger in the heating mode. Here, the nozzle is disposed in the nozzle housing portion, and a part of pressurizing portion is defined by the nozzle housing portion. Thus, the heating mode can be readily performed in the ejector cycle system.

12 Claims, 10 Drawing Sheets

HOT GAS MODE

EJECTOR CYCLE SYSTEM

CROSS-REFERENCE TO RELATED APPLICATION

This application is related to and claims priority from Japanese Patent Application No. 2002-345341 filed on Nov. 28, 2002, the content of which is hereby incorporated by reference.

BACKGROUND OF THE INVENTION

1. Field of the Invention

The present invention relates to an ejector cycle system that can set one of a cooling mode and a hot gas heating mode in an interior heat exchanger. The ejector cycle system is effectively used for a vehicle air conditioner.

2. Description of Related Art

Generally, a vapor compression refrigerant cycle includes an ejector cycle system and an expansion valve cycle system. For example, in an ejector cycle system disclosed in JP-A-5-149652, refrigerant evaporated in an evaporator is sucked into an ejector while refrigerant is decompressed and expanded in the ejector, and pressure of refrigerant to be sucked into a compressor is increased by converting expansion energy to pressure energy. On the other hand, in an expansion valve cycle system disclosed in U.S. Pat. No. 6,178,761, high-pressure refrigerant is decompressed by a fixed throttle such as an orifice and a capillary tube or a variable throttle such as a thermal expansion valve, and is supplied to an evaporator.

In the expansion valve cycle system, refrigerant is circulated in a single refrigerant stream from a compressor to the compressor through a radiator, an expansion valve and an evaporator in this order. On the other hand, in the ejector cycle system, refrigerant is circulated in two refrigerant streams. That is, refrigerant is circulated from a compressor to the compressor through a radiator, an ejector and a gas-liquid separator in this order, while refrigerant is circulated from the gas-liquid separator to the gas-liquid separator through the evaporator and the ejector in this order. Therefore, in the ejector cycle system, it is difficult to perform heating operation by using a hot gas heater cycle through which high-pressure and high-temperature refrigerant (hot gas refrigerant) discharged from the compressor is introduced into an interior heat exchanger (evaporator).

SUMMARY OF THE INVENTION

In view of the above problems, it is an object of the present invention to provide an ejector cycle system capable of readily performing a hot gas heating mode.

According to an aspect of the present invention, an ejector cycle system includes a compressor for sucking and compressing refrigerant, an exterior heat exchanger that performs heat exchange between refrigerant and outside air of a compartment, an interior heat exchanger that performs heat exchange between refrigerant and air to be blown into the compartment, and an ejector including a nozzle for decompressing and expanding refrigerant at a high pressure side. The ejector is provided to suck evaporated refrigerant at a low pressure side from a low-pressure suction port by a high speed stream of refrigerant jetted from the nozzle, and to increase pressure of refrigerant to be sucked into the compressor by converting expansion energy to pressure energy. The refrigerant discharged from the ejector flows into a gas liquid separator. In addition, the elector cycle system is provided with a bypass means through which refrigerant discharged from the compressor is decompressed and introduced to the interior heat exchanger while bypassing the exterior heat exchanger and the ejector. Further, a switching device is disposed for switching one of a cooling mode where refrigerant discharged from the compressor is supplied to the exterior heat exchanger, and a hot gas heating mode where the refrigerant discharged from the compressor is supplied to the interior heat exchanger through the bypass means. In the ejector cycle system, the interior heat exchanger is coupled to the ejector such that refrigerant flowing out of the interior heat exchanger is introduced into at least a refrigerant inlet of the nozzle in the hot gas heating mode. Therefore, refrigerant discharged from the interior heat exchanger can be readily introduced into the gas-liquid separator through the nozzle of the ejector, and the hot gas heating mode can be readily set.

Preferably, the interior heat exchanger is coupled to the ejector such that refrigerant flowing out of the interior heat exchanger is introduced to both of the low-pressure suction port of the ejector and the refrigerant inlet of the nozzle in the hot gas heating mode. In this case, refrigerant flowing out of the interior heat exchanger can be more readily introduced into the gas-liquid separator through the ejector.

According to an another aspect of the present invention, in the cooling mode, refrigerant discharged from the compressor flows through the exterior heat exchanger, the nozzle, a pressurization portion of the ejector and the gas-liquid separator in this order, while liquid refrigerant in the gas-liquid separator flows into the interior heat exchanger and gas refrigerant in the interior heat exchanger is sucked into the pressurization portion from the low-pressure suction port. On the other hand, in the hot gas heating mode, refrigerant discharged from the compressor flows into the nozzle, is introduced into the interior heat exchanger through the low-pressure suction port of the ejector, and flows into the gas-liquid separator, while bypassing the exterior heat exchanger. Thus, the hot gas heating mode can be readily performed.

According to a further another aspect of the present invention, in the hot gas heating mode, refrigerant discharged from the compressor is introduced into a clearance between an outer wall of the nozzle and an inner wall of a nozzle housing portion while bypassing the exterior heat exchanger, and flows into the interior heat exchanger from the ejector. More preferably, in the hot gas heating mode, refrigerant discharged from the compressor is introduced into the clearance from an outlet of the ejector connected to the gas-liquid separator, and flows into the interior heat exchanger through the low-pressure inlet port. Accordingly, the hot gas heating mode can be readily realized in the ejector cycle system.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

First Embodiment

The first embodiment will be described with reference to FIGS. 1–5. In the first embodiment, an ejector cycle system of the present invention is typically used for a vehicle air conditioner.

Figure 1:
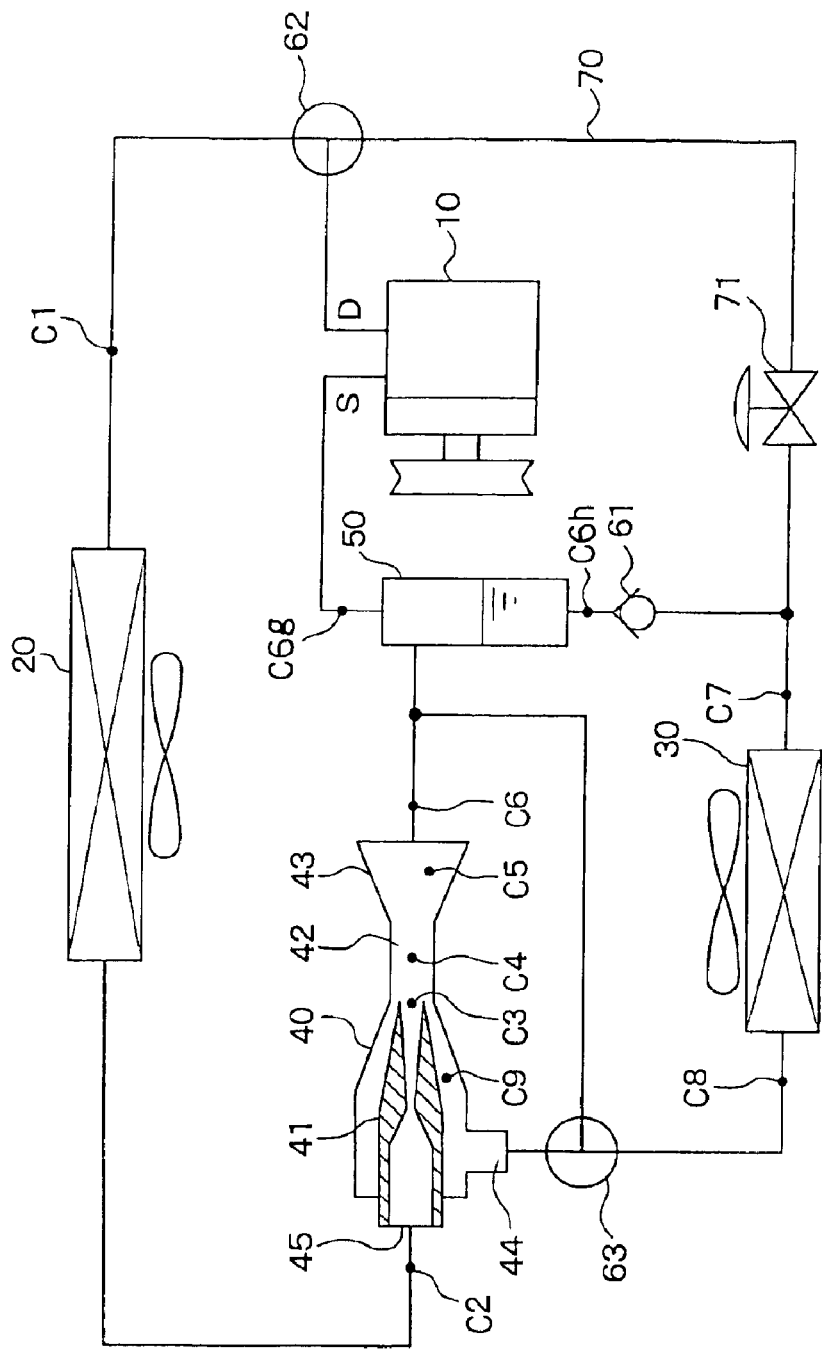
FIG. 1 is a schematic diagram showing an ejector cycle system according to a first embodiment of the present invention.

In the ejector cycle system of FIG. 1, a compressor 10 for sucking and compressing refrigerant is a continuously variable displacement compressor that is operated by motive power from a vehicle engine for running a vehicle, for example. However, the compressor 10 may be a fixed displacement compressor that is driven by an electric motor. An amount of refrigerant discharged from the compressor 10 is controlled so that air-conditioning capacity required in an interior heat exchanger 30 is controlled. Specifically, a cooling capacity required in a cooling mode and a heating capacity required in a hot gas heating mode can be controlled by controlling the amount of refrigerant discharged from the compressor 10.

An exterior heat exchanger 20 performs heat-exchange between outside air (i.e., air outside a passenger compartment of the vehicle) and refrigerant discharged from the compressor 10. An outlet of the exterior heat exchanger 20 is coupled to a high-pressure inlet port 45 of a nozzle 41 of an ejector 40. The interior heat exchanger 30 performs heat-exchange between refrigerant and air to be blown into the passenger compartment. The interior heat exchanger 30 includes an upstream heat-exchanging portion disposed at an upstream side in a flow direction of air passing therethrough and a downstream heat-exchanging portion disposed at a downstream side in the flow direction of air. Refrigerant passes through the interior heat exchanger 30 from the downstream heat-exchanging portion to the upstream heat-exchanging portion, regardless of an operation mode (e.g., cooling mode, hot gas heating mode) of the ejector cycle system.

The ejector 40 is disposed to decompress and expand refrigerant flowing out of the exterior heat exchanger 20 in the cooling mode. Then, the ejector 40 sucks refrigerant evaporated in the interior heat exchanger 30, by using pumping operation (Refer to JIS Z 8126 No. 2. 1. 2. 3) generated while the refrigerant is decompressed and expanded. At this time, the ejector 40 increases pressure of refrigerant to be sucked into the compressor 10 by converting expansion energy of refrigerant to pressure energy of refrigerant. Specifically, the ejector 40 includes the nozzle 41, a mixing portion 42 and a diffuser 43. The nozzle 41 decompresses refrigerant flowing into the ejector 40, substantially in isentropic by converting pressure energy of the refrigerant to speed energy of the refrigerant. The mixing portion 42 sucks refrigerant evaporated in the interior heat exchanger 30 from a low-pressure refrigerant suction port 44 by using a high-speed stream of refrigerant jetted from the nozzle 41. At this time, the mixing portion 42 mixes the sucked refrigerant from the interior heat exchanger 30 and the refrigerant jetted from the nozzle 41. Further, the diffuser 43 increases pressure of refrigerant to be sucked into the compressor 10 by converting the speed energy of the refrigerant to pressure energy of the refrigerant, and also mixes the sucked refrigerant and the jetted refrigerant.

In the mixing portion 42, the jetted refrigerant (driving refrigerant) and the sucked refrigerant (driven refrigerant) are mixed so that a total momentum thereof is conserved. Therefore, also in the mixing portion 42, refrigerant pressure (stationary pressure) is increased. In the diffuser 43, the speed energy of refrigerant (dynamic pressure) is converted to the pressure energy of refrigerant (stationary pressure) by gradually increasing a sectional passage area of the diffuser 43. Accordingly, the refrigerant pressure is increased in both of the mixing portion 42 and the diffuser 43. Therefore, a pressurization portion is constructed of both of the mixing portion 42 and the diffuser 43. In the first embodiment, a Laval nozzle (refer to "Fluid Technology" published by "Tokyou University Publisher") is used as the nozzle 41. The Laval nozzle has a throttle portion at which a nozzle refrigerant passage has the smallest passage area for increasing a speed of refrigerant jetted from the nozzle 41 equal to or higher than the sound velocity. In the first embodiment, a taper nozzle may be used as the nozzle 41.

Refrigerant from an outlet of the ejector 40 flows into a gas-liquid separator 50. The gas-liquid separator 50 separates the refrigerant into gas refrigerant and liquid refrigerant, and stores the separated refrigerant therein. A gas refrigerant outlet of the gas-liquid separator 50 is connected to a suction side of the compressor 10, and a liquid refrigerant outlet of the gas-liquid separator 50 is connected to an inlet side of the interior heat exchanger 30.

A check valve 61 is provided in a refrigerant passage between the liquid refrigerant outlet of the gas-liquid separator 50 and the interior heat exchanger 30. The check valve 61 permits a refrigerant flow only from the gas-liquid separator 50 to the interior heat exchanger 30, and prevents refrigerant from flowing from the interior heat exchanger 30 to the gas-liquid separator 50. Refrigerant, flowing from the gas-liquid separator 50 to the interior heat exchanger 30, is decompressed to a predetermined level by the check valve 61 provided between the gas-liquid separator 50 and the interior heat exchanger 30. Accordingly, a predetermined pressure loss is generated in the check valve 61 while refrigerant flows from the gas-liquid separator 50 to the interior heat exchanger 30. In the drawings, a check valve is indicated by a reference symbol based on JIS B 0125 (1988).

Refrigerant (hot gas refrigerant), discharged from the compressor 10, is introduced into the interior heat exchanger 30 through a bypass passage 70 while bypassing the exterior heat exchanger 20 and the ejector 40. The hot gas refrigerant is decompressed by a decompression device 71 provided in the bypass passage 70. A bypass means in the present invention is constructed with the bypass passage 70 and the decompression device 71.

A first three-way valve 62 is provided in the bypass passage 70 at a discharge side of the compressor 10 to switch any one of the cooling mode and the hot gas heating mode. Refrigerant, discharged from the compressor 10 is supplied to the exterior heat exchanger 20 in the cooling mode, and is supplied to the interior heat exchanger 30 through the bypass passage 70 in the hot gas heating mode. A second three-way valve 63 is provided at a refrigerant outlet side of the interior heat exchanger 30 the second three-way valve 63 is operated such that, the refrigerant flowing out of the interior heat exchanger 30 is introduced to the low-pressure refrigerant suction port 44 of the ejector 40 in the cooling mode, and the refrigerant flowing out of the interior heat exchanger 30 is introduced to the gas-liquid separator 50 while bypassing the ejector 40 in the hot gas heating mode. Both of the three-way valves 62, 63 are controlled by an electronic control unit (ECU).

Figure 4:
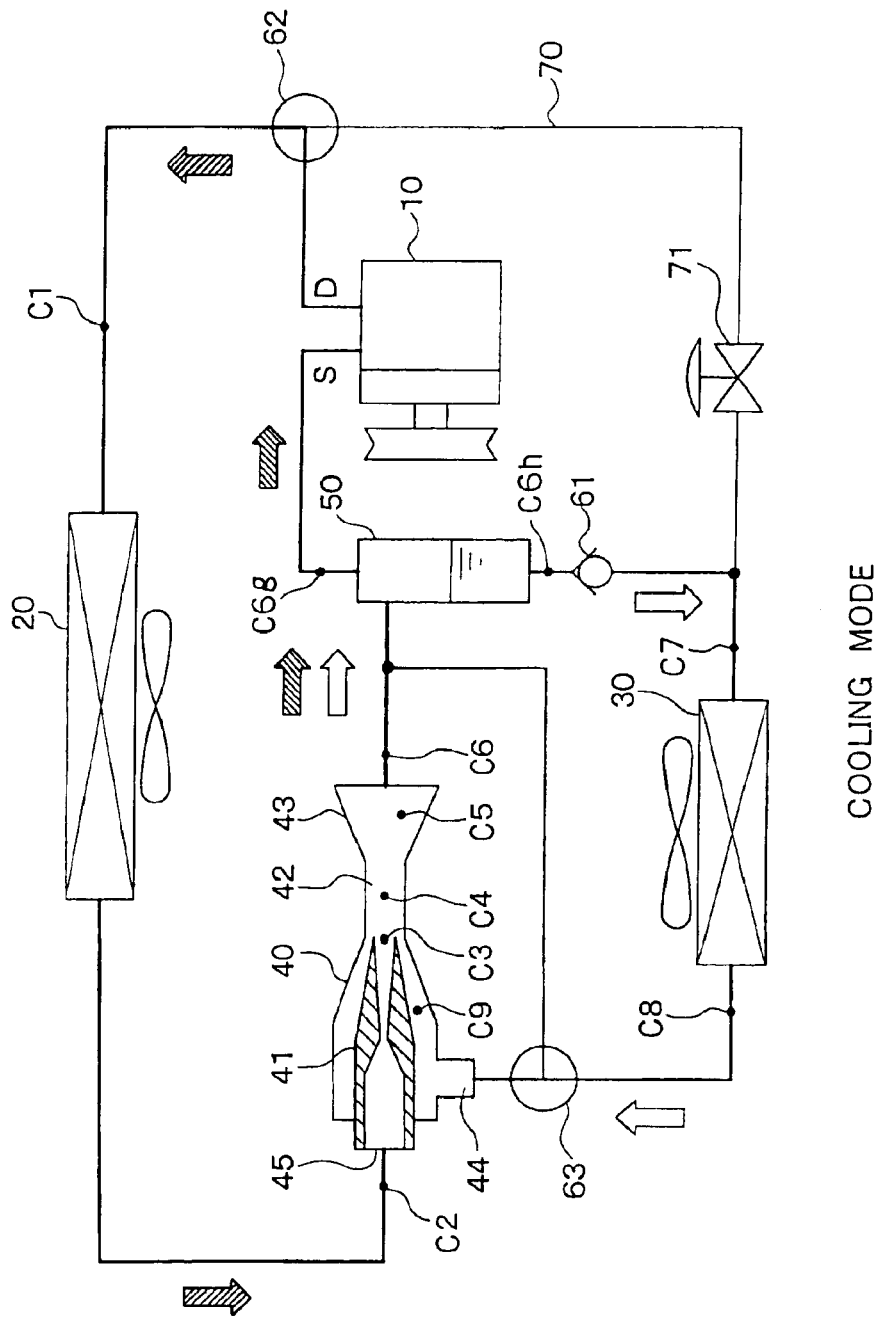
FIG. 4 is a schematic diagram showing a refrigerant flow in the ejector cycle system in the cooling mode, according to the first embodiment.

Next, operation of the ejector cycle system in the first embodiment will be described. In the cooling mode, as shown in FIG. 4, refrigerant discharged from the compressor 10 is circulated to the exterior heat exchanger 20 to be cooled in the exterior heat exchanger 20. Refrigerant cooled by the exterior heat exchanger 20 is decompressed and expanded by the nozzle 41 of the ejector 40 in isentropic, and flows into the mixing portion 42 at a speed equal to or higher than the sound velocity. Therefore, refrigerant, evaporated in the interior heat exchanger 30 by absorbing heat from air to be blown into the passenger compartment, is sucked into the mixing portion 42 by using the pumping operation due to entrainment operation of the high-speed refrigerant jetted from the nozzle 41 into the mixing portion 42. Thus, low-pressure refrigerant is circulated from the gas-liquid separator 50 to the gas-liquid separator 50 through the interior heat exchanger 30 and the pressurization portion of the ejector 40 in this order.

Refrigerant (suction refrigerant) sucked from the interior heat exchanger 30 and refrigerant (driving refrigerant) jetted from the nozzle 41 are mixed in the mixing portion 42. Then, the dynamic pressure of the mixed refrigerant is converted to the stationary pressure thereof in the diffuser 43, and the mixed refrigerant is returned to the gas-liquid separator 50.

Figure 2:
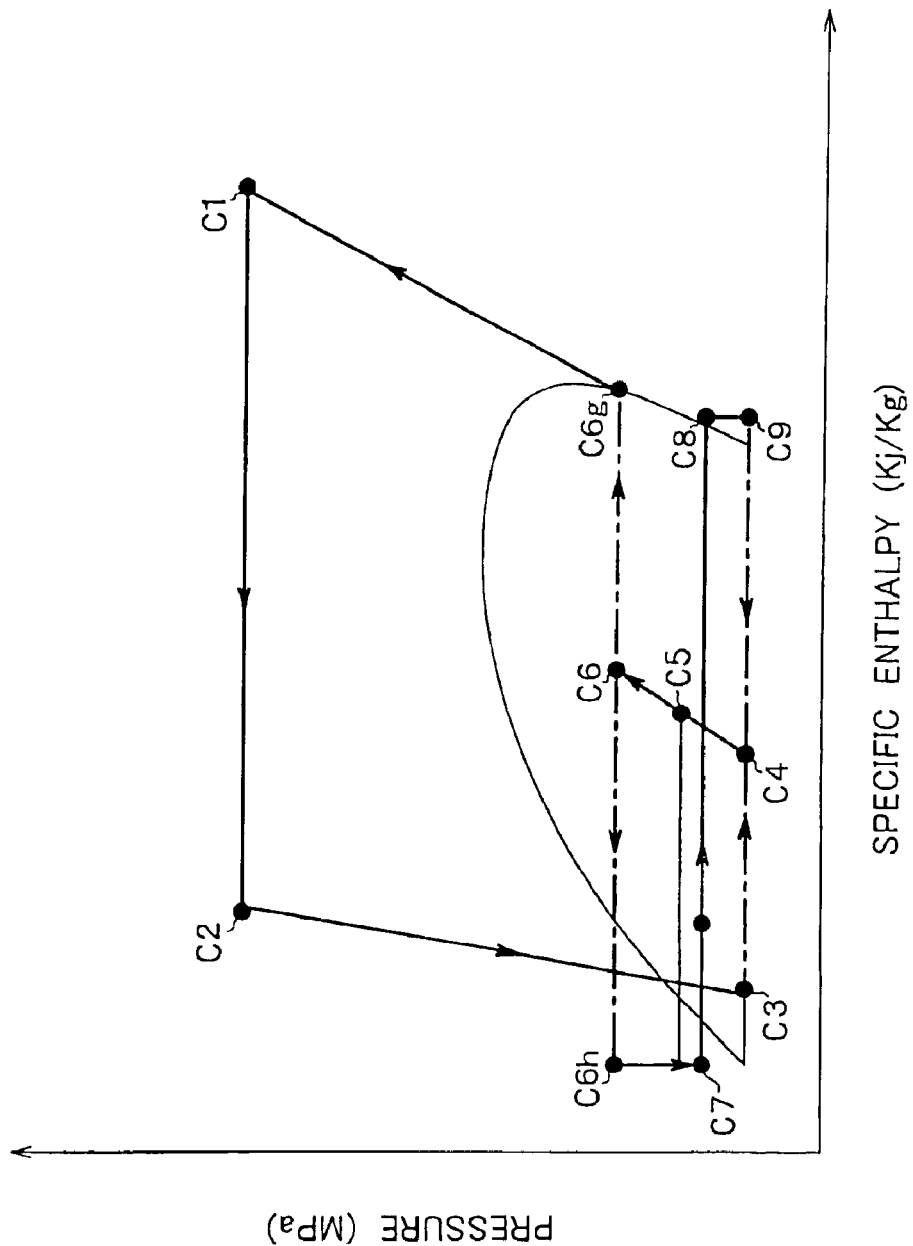
FIG. 2 is a p-h diagram (Mollier diagram) macroscopically showing operation of the ejector cycle system in a cooling mode.

In the first embodiment, carbon dioxide is used as refrigerant, for example. When a thermal load (cooling load) of the interior heat exchanger 30 is large, high-pressure refrigerant, to be introduced into the nozzle 41, is compressed by the compressor 10 to have a pressure equal to or higher than the critical pressure of refrigerant as shown in FIG. 2, thereby ensuring a required cooling capacity of the interior heat exchanger 30. Black points denoted by reference numerals C1–C9 in FIG. 2 show refrigerant states at positions of black points denoted by the same reference numerals in FIG. 1, respectively.

Figure 5:
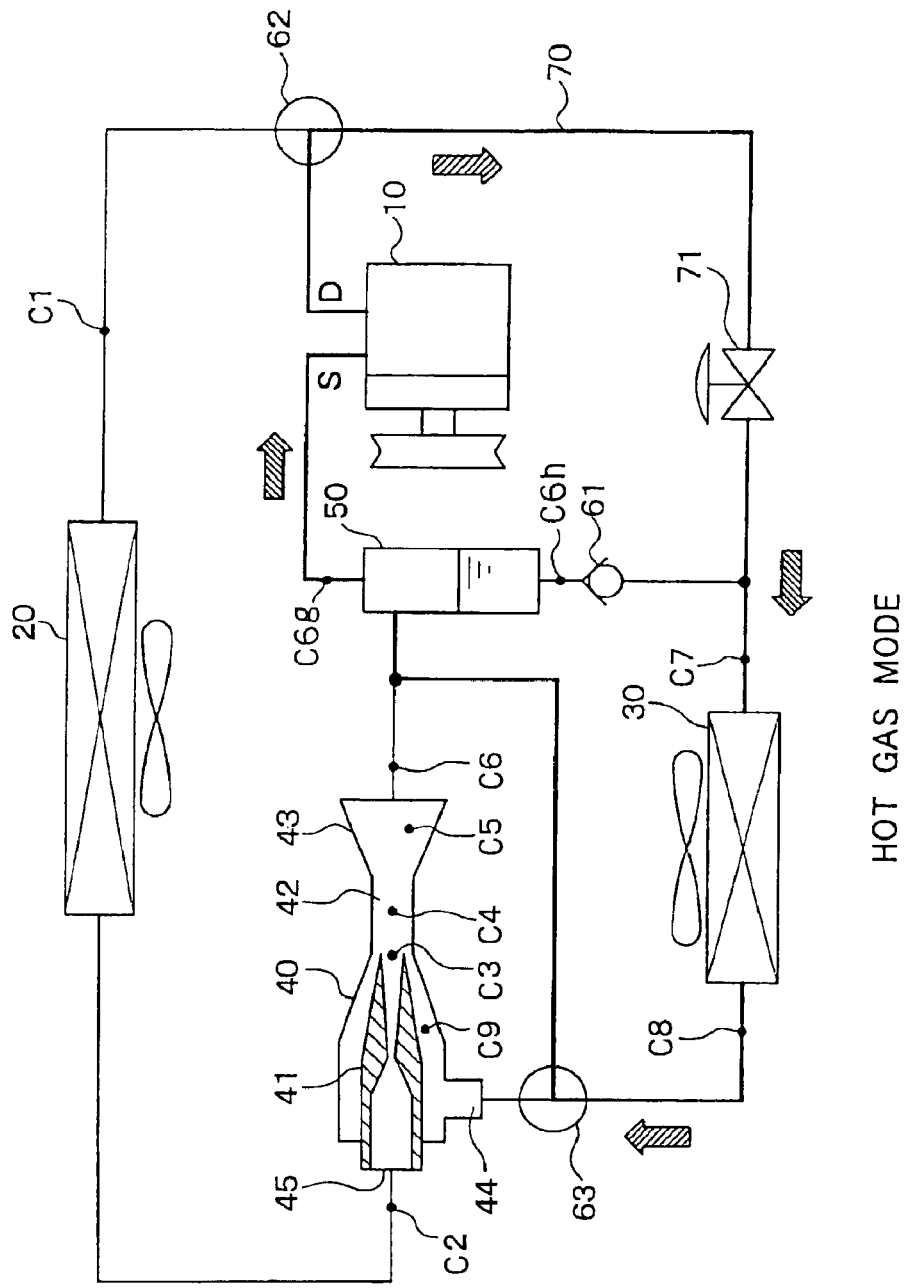
FIG. 5 is a schematic diagram showing a refrigerant flow in the ejector cycle system in the hot gas heating mode (hot gas mode), according to the first embodiment.

In the hot gas heating mode (hot gas mode), as shown in FIG. 5, the hot gas refrigerant discharged from the compressor 10 is introduced to the interior heat exchanger 30 through the bypass passage 70. Therefore, air to be blown into the passenger compartment is heated in the interior heat exchanger 30 by the hot gas refrigerant flowing into the interior heat exchanger 30. The decompression device 71 decompresses the hot gas refrigerant to a pressure level corresponding to a pressure-resistant strength of the interior heat exchanger 30. Therefore, the decompression device 71 does not decompress the hot gas refrigerant to a gas-liquid two-phase state. That is, the decompression device 71 is different from an expansion valve in an expansion valve cycle system for decompressing refrigerant to the gas-liquid two-phase state.

Figure 3:
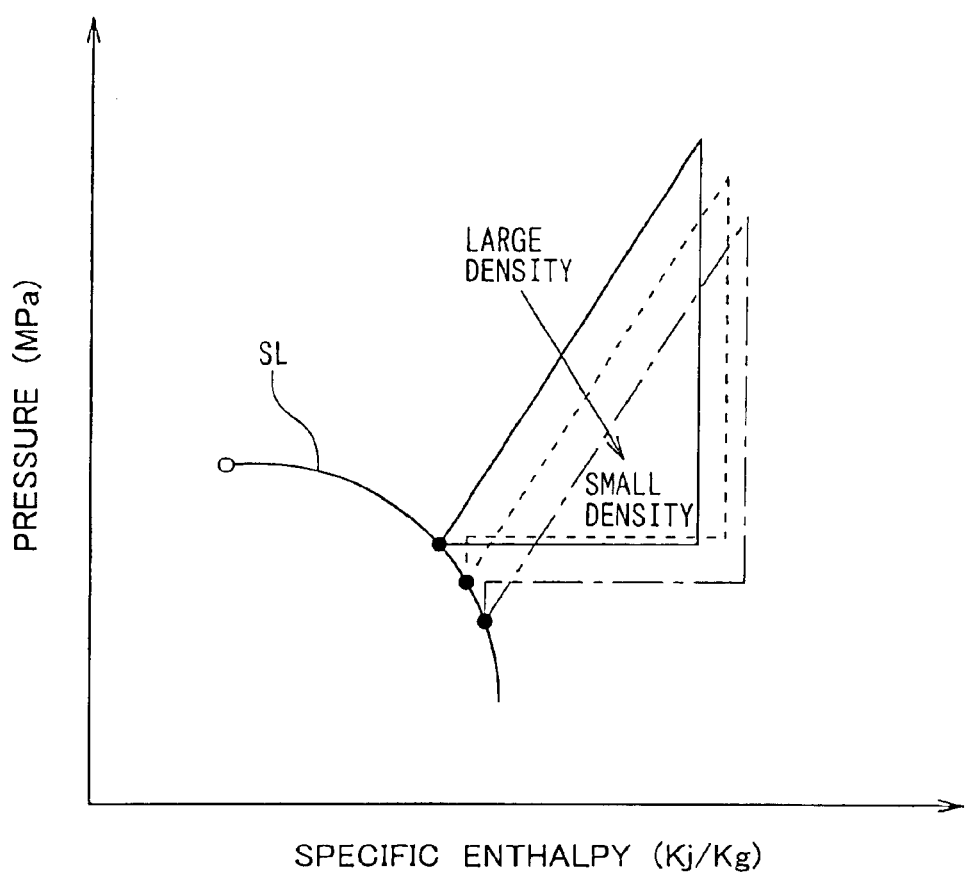
FIG. 3 is a p-h diagram (Mollier diagram) macroscopically showing operation of the ejector cycle system in a hot gas heating mode.

In the hot gas heating mode, as shown in FIG. 3, as the density of refrigerant, to be sucked into the compressor 10, reduces, heating capacity of the interior heat exchanger 30 is reduced. In FIG. 3, SL indicates the saturated line in the Mollier diagram. Therefore, preferably, in the hot gas heating mode, a pressure loss generated in the refrigerant circuit except for the pressure loss generated in the decompression device 71 is made small.

According to the first embodiment of the present invention, in the ejector cycle system, any one of the cooling mode and the hot gas heating mode can be readily switched.

Second Embodiment

Figure 6:
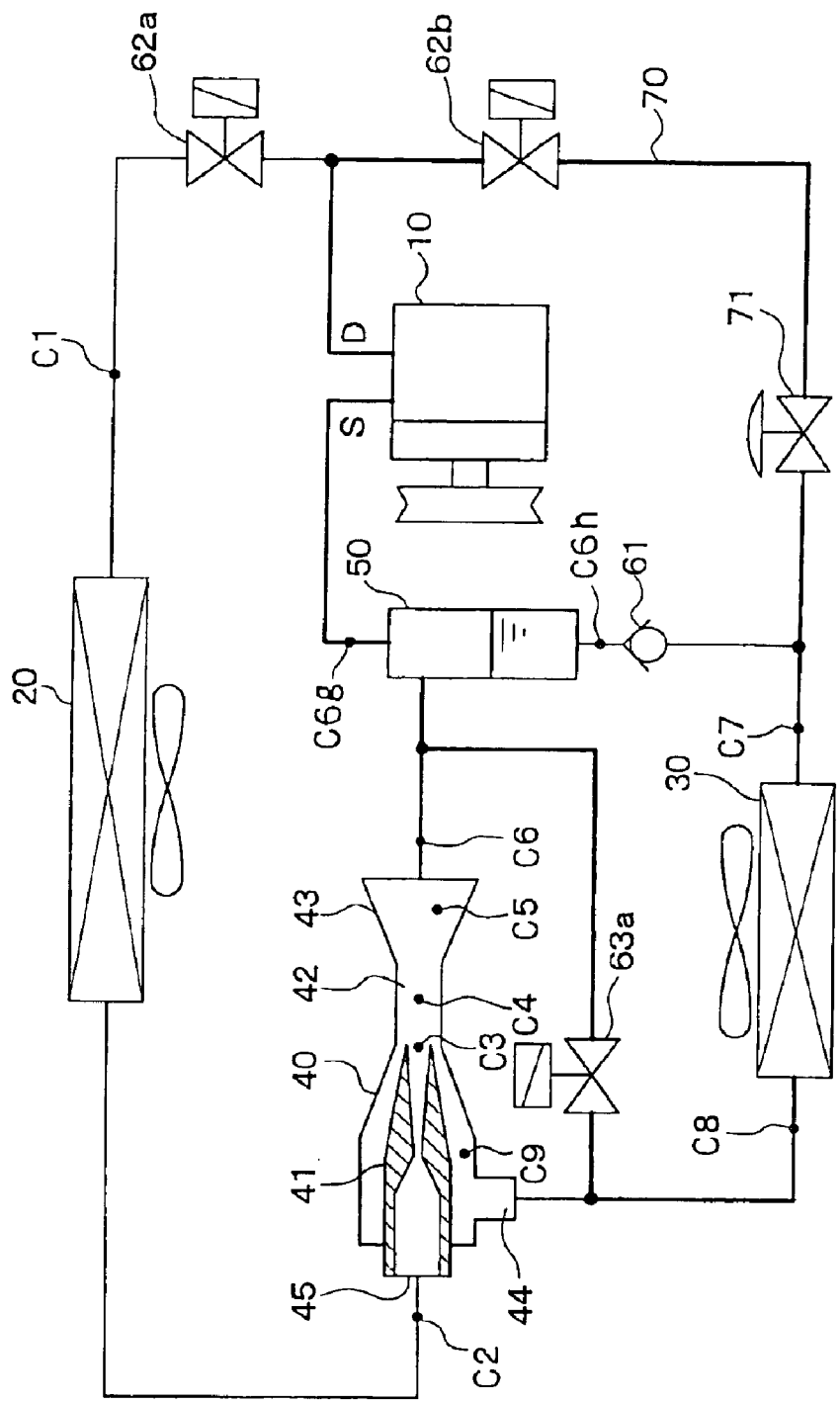
FIG. 6 is a schematic diagram showing an ejector cycle system according to a second embodiment of the present invention.

In the above-described first embodiment, the refrigerant flow is switched by the first and second three-way valves 62, 63. However, in the second embodiment, as shown FIG. 6, the refrigerant flow is switched by two-way valves 62a, 62b, 63a. Specifically, in the cooling mode, the valve 62a is opened, the valve 62b is closed, and the valve 63a is closed. On the other hand, in the hot gas heating mode, the valve 62a is closed, the valve 62b is opened, and the valve 63a is opened. Therefore, in the hot gas heating mode, hot gas refrigerant discharged from the compressor 10 flows into the interior heat exchanger 30 through the bypass passage 70. In this case, refrigerant from the interior heat exchanger 30 flows into the gas-liquid separator 50 while bypassing at least the nozzle 41 of the ejector 40. That is, refrigerant flowing from the interior heat exchanger 30 can be introduced into the pressurization portion (i.e., the mixing portion 42 and the diffuser 43).

In the second embodiment, the other parts are similar to those of the above-described first embodiment.

Third Embodiment

Figure 7:
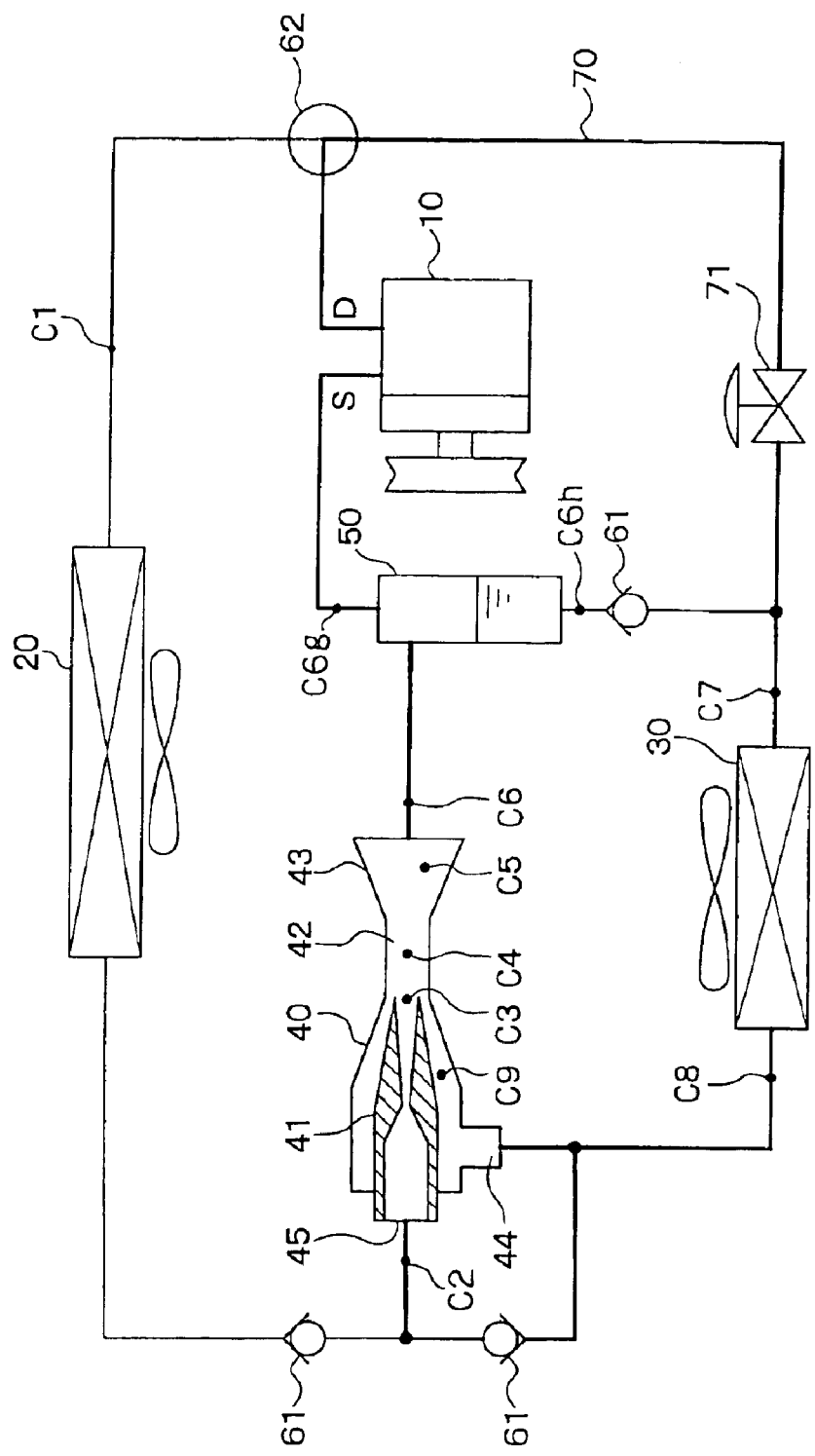
FIG. 7 is a schematic diagram showing an ejector cycle system according to a third embodiment of the present invention.

In the above-described first embodiment, refrigerant flowing out of the interior heat exchanger 30 is introduced to the gas-liquid separator 50 while bypassing the ejector 40 in the hot gas heating mode. However, in the third embodiment, as shown in FIG. 7, refrigerant flowing out of the interior heat exchanger 30 is introduced to the gas-liquid separator 50 through the ejector 40 in the hot gas heating mode. In the example of FIG. 7, the refrigerant flowing out of the interior heat exchanger 30 is introduced to both of the low-pressure refrigerant suction port 44 of the ejector 40 and the refrigerant inlet port 45 of the nozzle 41. However, the refrigerant flowing out of the interior heat exchanger 30 can be introduced to one of the low-pressure refrigerant suction port 44 and the refrigerant inlet port 45 in the hot gas heating mode. For example, all refrigerant from the interior heat exchanger 30 can be introduced to the refrigerant inlet port 45 of the nozzle 41 in the hot gas heating mode.

Further, an adjustment valve such as a needle valve for controlling a throttle open degree of the nozzle 41 can be provided. In this case, the throttle open degree of the nozzle 41 can be set at a maximum degree in the hot gas heating mode.

In the third embodiment, as shown in FIG. 7, additional check valves 61 are provided as compared with the first embodiment, so that hot gas refrigerant discharged from the compressor 10 bypasses the exterior heat exchanger 20 in the hot gas heating mode and it can prevent refrigerant from the exterior heat exchanger 20 from flowing into the interior heat exchanger 30 in the cooling mode. However, the other valve device for switching the refrigerant flow in the ejector cycle system can be used.

In the third embodiment, the other parts are similar to those of the above-described first embodiment.

Fourth Embodiment

Figure 8:
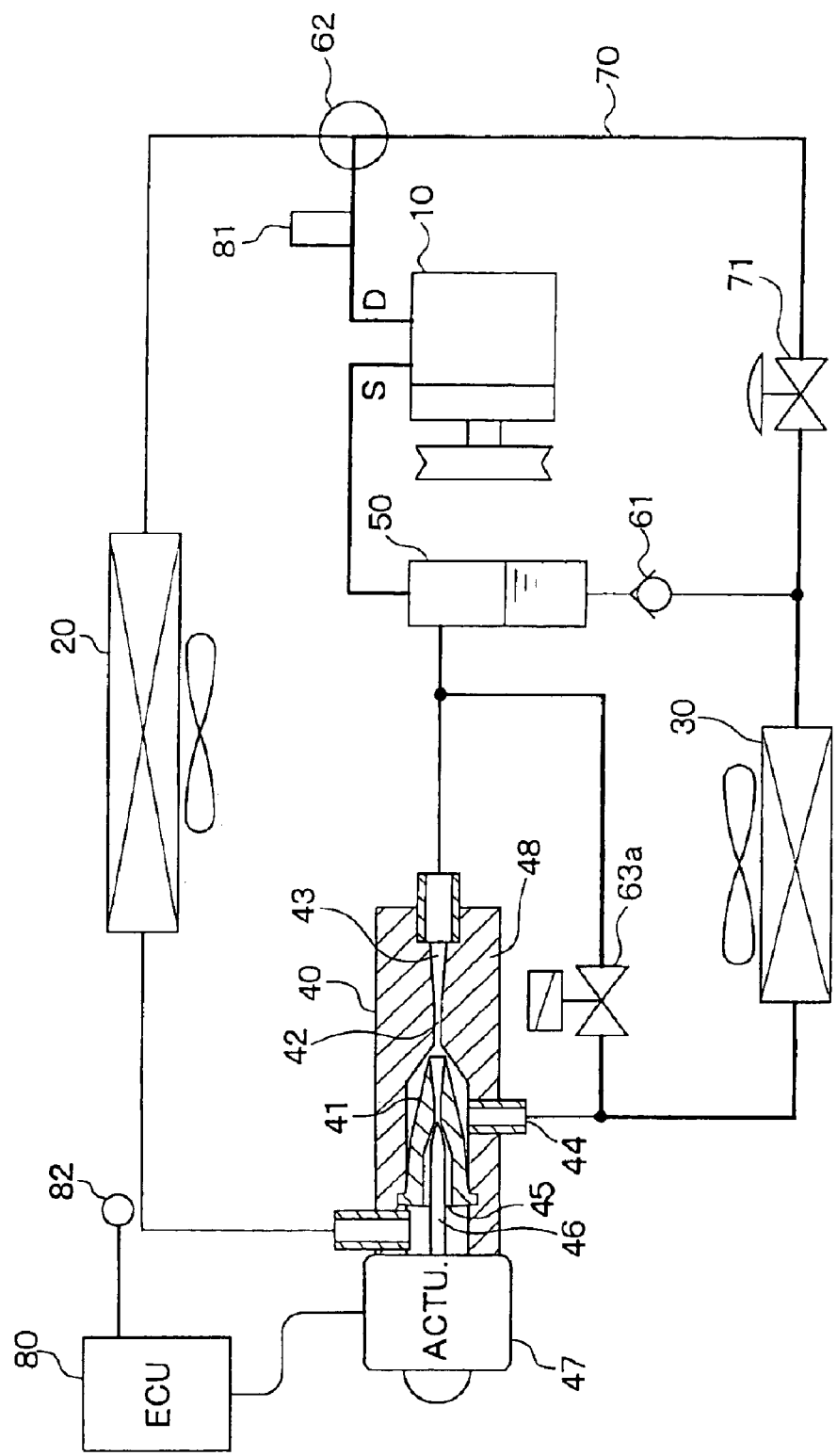
FIG. 8 is a schematic diagram showing an ejector cycle system according to a fourth embodiment of the present invention.

The fourth embodiment of the present invention will be now described with reference to FIG. 8. In the fourth embodiment, as shown in FIG. 8, an open degree of the refrigerant inlet 45 is adjusted by a needle valve 46. More specifically, a throttle opening degree of the nozzle 41 of the ejector 40 is adjusted by the needle valve 46 thereby variably controlling a flow amount and a pressure of high-pressure refrigerant.

As shown in FIG. 8, a refrigerant pressure sensor 81 is provided at a discharge side of the compressor 10, and a refrigerant temperature sensor 82 is provided at a refrigerant outlet side of the exterior heat exchanger 20. The refrigerant pressure sensor 81 detects the pressure of high-pressure side refrigerant in the ejector cycle system, and the refrigerant temperature sensor 82 detects a temperature of high-pressure refrigerant flowing from the exterior heat exchanger 20. Detection signals of the sensors 81, 82 are input to an electronic control unit (ECU) 80. The ECU 80 controls a movement position of the needle valve 46 by using an actuator 47, so that pressure of high-pressure refrigerant detected by the pressure sensor 81 becomes a target refrigerant pressure that is determined based on the temperature of high-pressure refrigerant detected by the refrigerant temperature sensor 82.

The refrigerant flow in the ejector cycle system of the third embodiment is switched by using the valves 62, 63a. However, the refrigerant flow in the ejector cycle system can be switched by the other switching means.

Further, in the fourth embodiment, the open degree of the refrigerant inlet 45 of the nozzle 41, that is, the throttle open degree of the nozzle 41 is controlled based on the refrigerant temperature at the outlet side of the exterior heat exchanger 30. However, the open degree of the refrigerant inlet 45 can be controlled based on an air conditioning load of the interior heat exchanger 30 or a super-heating degree of refrigerant flowing out of the interior heat exchanger 30, without being limited to this manner.

In the fourth embodiment, the refrigerant flow in the ejector cycle system in the hot gas heating mode is similar to that in the second embodiment. In the hot gas heating mode, the three-way valve 62 is operated so that hot gas refrigerant discharged from the compressor 10 flows into the interior heat exchanger through the bypass passage 70. Therefore, air passing through the interior heat exchanger 30 is heated in the interior heat exchanger 30. Then, refrigerant discharged from the interior heat exchanger 30 flows into the gas-liquid separator 50 through at least one of the valve 63a and the pressurization portion 42, 43 of the ejector 40 while bypassing at least the nozzle 41 of the ejector 40.

In the fourth embodiment, because the throttle opening degree of the nozzle 41 is controlled, the heating capacity or the cooling capacity in the interior heat exchanger 30 can be accurately controlled while ejector efficient can be improved. In the fourth embodiment, the valves 62, 63a are also controlled by the ECU 80.

Fifth Embodiment

Figure 9:
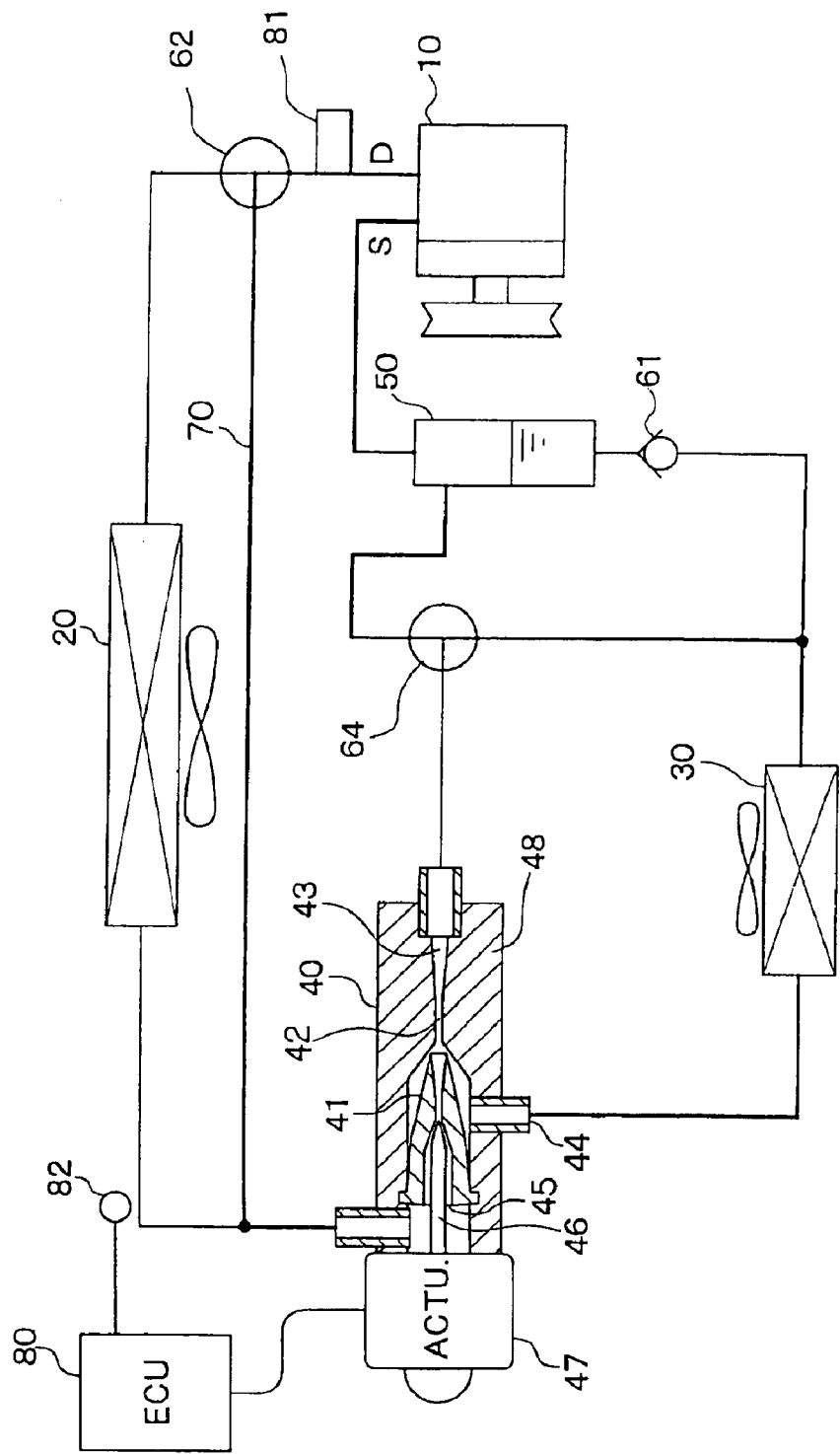
FIG. 9 is a schematic diagram showing an ejector cycle system according to a fifth embodiment of the present invention.
Figure 10:
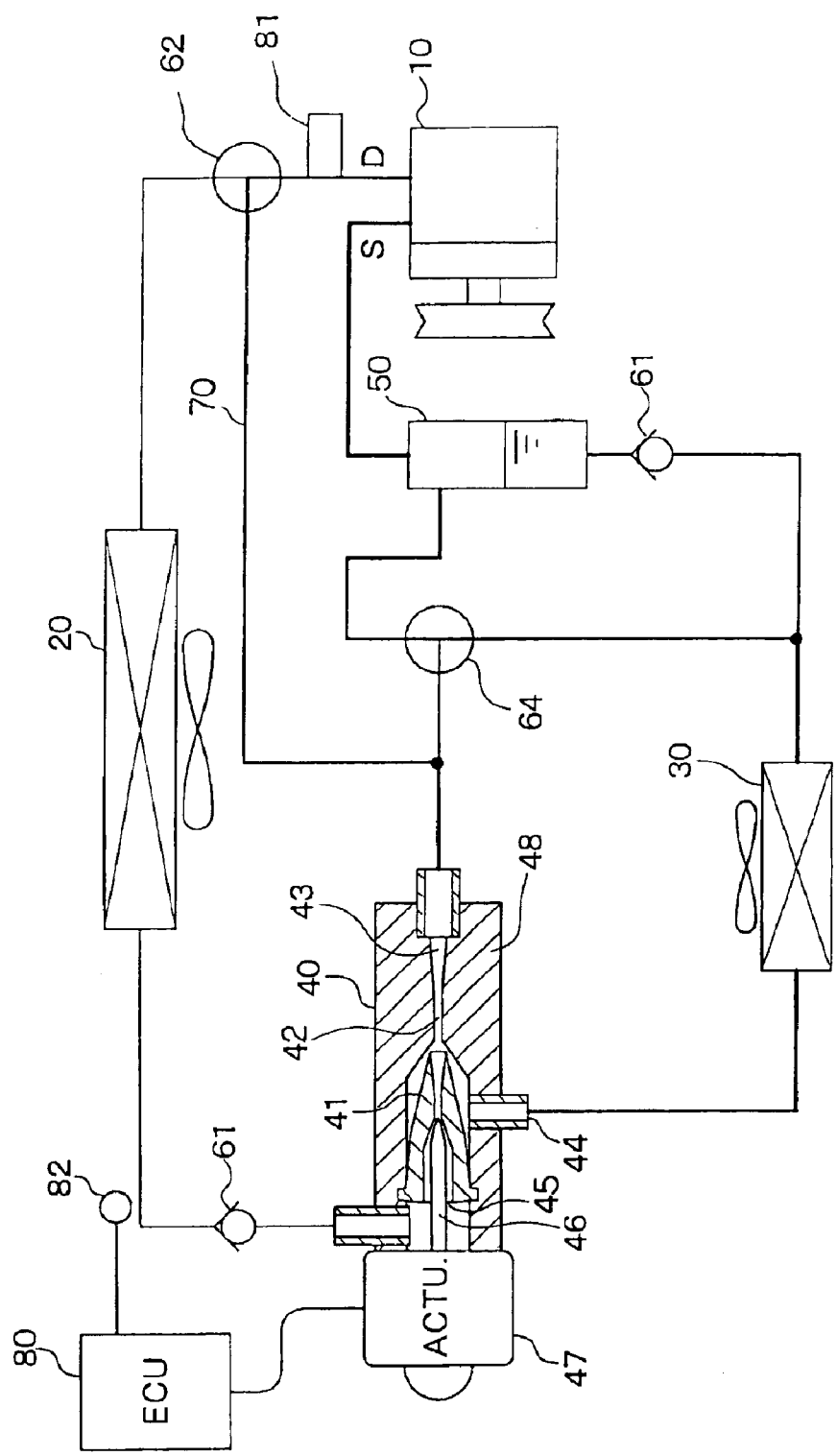
FIG. 10 is a schematic diagram showing an ejector cycle system according to the fifth embodiment.

The fifth embodiment of the present invention will be now described with reference to FIGS. 9 and 10. In the above embodiments, the hot gas refrigerant, to flow into the interior heat exchanger 30, is decompressed by the decompression device 71 in the hot gas heating mode. However, in the fifth embodiment, as shown in FIGS. 9, 10, the hot gas refrigerant is decompressed by using the ejector 40 in the hot gas heating mode. Further, a three-way valve 64 is provided at an outlet side of the ejector 40 to switch a refrigerant flow of the ejector cycle system in the hot gas heating mode.

Specifically, in an example shown in FIG. 9, the valves 62 and 64 are operated such that the hot gas refrigerant discharged from the compressor 10 flows through the nozzle 41, the interior heat exchanger 30 and the gas-liquid separator 50 in this order while bypassing the exterior heat exchanger 20, in the hot gas heating mode. That is, in the hot gas heating mode, the hot gas refrigerant from the compressor 10 flows into the nozzle 41 through a bypass passage 70 while bypassing the exterior heat exchanger 20, and refrigerant decompressed in the nozzle 41 flows into the interior heat exchanger 30 through the low-pressure refrigerant suction port 44, without being directly discharged into the gas-liquid separator 50. The throttle open degree of the nozzle 41 in the hot gas heating mode is set larger in accordance with the pressure resistance strength of the interior heat exchanger 30. Refrigerant from the interior heat exchanger 30 flows into the gas-liquid separator 50, and gas refrigerant from the gas-liquid separator 50 is introduced to the compressor 10.

In an example shown in FIG. 10, the hot gas refrigerant, discharged from the compressor 10, is introduced to a clearance between an outer wall of the nozzle 41 and an inner wall of a housing portion 48 through a bypass passage 70 while bypassing the exterior heat exchanger 20, in the hot gas heating mode. The nozzle 41 is disposed in the housing 48 for defining a part of the mixing portion 42 and the diffuser 43. Then, the refrigerant introduced into the clearance between the outer wall of the nozzle 42 and the inner wall of the housing 48 flows into the interior heat exchanger 30 through the low-pressure refrigerant suction port 44, and is discharged into the gas-liquid separator 50 from the interior heat exchanger 30. Thereafter, gas refrigerant in the gas-liquid separator 50 is supplied to the compressor 10.

Accordingly, in the example of FIG. 10, the hot gas refrigerant from the compressor 10 flows into the outlet of the ejector 40 through the bypass passage 70 while bypassing the exterior heat exchanger 20, in the hot gas heating mode. Further, the refrigerant flowing into the ejector 40 is introduced into the exterior heat exchanger 30 through the clearance of the ejector 40 and the low-pressure refrigerant suction port 44.

In the fifth embodiment, the refrigerant flow in the ejector cycle system in the cooling mode is similar to that in the above-described first embodiment.

Other Embodiments

Although the present invention has been fully described in connection with the preferred embodiments thereof with reference to the accompanying drawings, it is to be noted that various changes and modifications will become apparent to those skilled in the art.

For example, in the above-described embodiments, the interior heat exchanger 30 is constructed with the downstream heat-exchanging portion and the upstream heat-exchanging portion. However, the interior heat exchanger 30 can be constructed with a single heat exchanging portion without being divided into the two parts in the air flowing direction. Further, the interior heat exchanger 30 can be constructed to have a general heat exchanging structure.

Further, in the above-described embodiments, the present invention is typically applied to the vehicle air conditioner. However, the present invention can be applied to other devices. In the above-described embodiments, carbon dioxide is used as refrigerant, and the pressure of high-pressure refrigerant is set equal to or higher than the critical pressure of refrigerant. However, the other refrigerants can be used, and the pressure of the high-pressure refrigerant can be set smaller than the critical pressure of the refrigerant.

Such changes and modifications are to be understood as being within the scope of the present invention as defined by the appended claims.

What is claimed is:

1. An ejector cycle system comprising:
   a compressor for sucking and compressing refrigerant;
   an exterior heat exchanger that performs heat exchange between refrigerant and outside air of a compartment;
   an interior heat exchanger that performs heat exchange between refrigerant and air to be blown into the compartment;
   an ejector including a nozzle for decompressing and expanding refrigerant at a high pressure side, the ejector being provided to suck evaporated refrigerant at a low pressure side from a low-pressure suction port by a high speed stream of refrigerant jetted from the nozzle, and to increase pressure of refrigerant to be sucked into the compressor by converting expansion energy to pressure energy;
   a gas-liquid separator for separating refrigerant flowing out of the ejector into gas refrigerant and liquid refrigerant, the gas-liquid separator having a gas refrigerant outlet from which the gas refrigerant is supplied to the compressor and a liquid refrigerant outlet from which the liquid refrigerant is supplied to the low pressure side;
   a bypass means through which refrigerant discharged from the compressor is decompressed and introduced to the interior heat exchanger while bypassing the exterior heat exchanger and the ejector; and
   a switching device for switching one of a cooling mode where refrigerant discharged from the compressor is supplied to the exterior heat exchanger, and a hot gas heating mode where the refrigerant discharged from the compressor is supplied to the interior heat exchanger through the bypass means,
   wherein the interior heat exchanger is coupled to the ejector such that refrigerant flowing out of the interior heat exchanger is introduced into at least a refrigerant inlet of the nozzle in the hot gas heating mode.

2. The ejector cycle system according to claim 1, wherein the interior heat exchanger is coupled to the ejector such that refrigerant flowing out of the interior heat exchanger is introduced to both of the low-pressure suction port of the ejector and the refrigerant inlet of the nozzle in the hot gas heating mode.

3. The ejector cycle system according to claim 1, wherein the ejector includes an adjustment member for adjusting a throttle opening degree of the nozzle.

4. The ejector cycle system according to claim 1, wherein the interior heat exchanger includes a first heat exchanging portion, and a second heat exchanging portion arranged upstream of the first heat exchanging portion in an air flow direction; and
   the first heat exchanging portion is positioned upstream of the second heat exchanging portion in a refrigerant flow of the interior heat exchanger in each of the cooling mode and the hot gas heating mode.

5. The ejector cycle system according to claim 1, further comprising a flow rate adjusting device for adjusting an amount of refrigerant flowing into the nozzle based on a thermal load in the interior heat exchanger.

6. The ejector cycle system according to claim 1, wherein carbon dioxide is used as refrigerant.

7. The ejector cycle system according to claim 1, wherein the compressor is operated to set a super-critical operation mode where the refrigerant discharged from the compressor has a pressure equal to or higher than the critical pressure of the refrigerant.

8. An ejector cycle system comprising:
   a compressor for sucking and compressing refrigerant;
   an exterior heat exchanger that performs heat exchange between refrigerant and outside air of a compartment;
   an interior heat exchanger that performs heat exchange between refrigerant and air to be blown into the compartment;
   an ejector including a nozzle for decompressing and expanding refrigerant at a high pressure side and a pressurization portion having a low-pressure suction port from which refrigerant evaporated at a low pressure side is sucked by a high speed stream of refrigerant jetted from the nozzle, the pressurization portion being provided to mix the refrigerant sucked from the low-pressure suction port and the refrigerant jetted from the nozzle and to increase pressure of refrigerant to be sucked into the compressor by converting expansion energy to pressure energy;
   a gas-liquid separator for separating refrigerant flowing out of the ejector into gas refrigerant and liquid refrigerant, the gas-liquid separator having a gas refrigerant outlet from which the gas refrigerant is supplied to the compressor and a liquid refrigerant outlet from which the liquid refrigerant is supplied to the low pressure side; and
   a switching device for switching one of a cooling mode and a hot gas heating mode, wherein:
   in the cooling mode, refrigerant discharged from the compressor flows through the exterior heat exchanger, the nozzle, the pressurization portion and the gas-liquid separator in this order, while liquid refrigerant in the gas-liquid separator flows into the interior heat exchanger and gas refrigerant in the interior heat exchanger is sucked into the pressurization portion from the low-pressure suction port; and
   in the hot gas heating mode, refrigerant discharged from the compressor flows into the nozzle, is introduced into the interior heat exchanger through the low-pressure suction port, and flows into the gas-liquid separator, while bypassing the exterior heat exchanger.

9. The ejector cycle system according to claim 8, wherein:
   the ejector includes a housing portion for defining at least a part of the pressurization portion;
   the nozzle is disposed in the housing portion to have a clearance between an inner wall of the housing and an outer wall of the nozzle; and
   the clearance is provided in such a manner than refrigerant discharged from the nozzle is supplied to the interior heat exchanger through the clearance in the hot gas heating mode.

10. The ejector cycle system according to claim 8, wherein the ejector includes an adjustment member for adjusting a throttle opening degree of the nozzle.

11. An ejector cycle system comprising:
    a compressor for sucking and compressing refrigerant;
    an exterior heat exchanger that performs heat exchange between refrigerant and outside air of a compartment;
    an interior heat exchanger that performs heat exchange between refrigerant and air to be blown into the compartment;

an ejector including a nozzle for decompressing and expanding refrigerant at a high pressure side and a pressurization portion having a low-pressure suction port from which refrigerant evaporated at a low pressure side is sucked by a high speed stream of refrigerant jetted from the nozzle, the pressurization portion being provided to mix the refrigerant sucked from the low-pressure suction port and the refrigerant jetted from the nozzle and to increase pressure of refrigerant to be sucked into the compressor by converting expansion energy to pressure energy;

a gas-liquid separator for separating refrigerant flowing out of the ejector into gas refrigerant and liquid refrigerant, the gas-liquid separator having a gas refrigerant outlet from which the gas refrigerant is supplied to the compressor and a liquid refrigerant outlet from which the liquid refrigerant is supplied to the low pressure side; and a switching device for switching one of a cooling mode and a hot gas heating mode, wherein:

the ejector includes a housing portion for defining at least a part of the pressurization portion;

the nozzle is disposed in the housing portion to have a clearance between an inner wall of the housing and an outer wall of the nozzle;

in the cooling mode, refrigerant discharged from the compressor flows through the exterior heat exchanger, the nozzle, the pressurization portion and the gas-liquid separator in this order, while liquid refrigerant in the gas-liquid separator flows into the interior heat exchanger and refrigerant evaporated in the interior heat exchanger is sucked into the pressurization portion from the low-pressure suction port; and in the hot gas heating mode, refrigerant discharged from the compressor is introduced into the clearance while bypassing the exterior heat exchanger, and flows into the interior heat exchanger from the ejector.

12. The ejector cycle system according to claim 11, wherein:

in the cooling mode, refrigerant discharged from an outlet of the ejector flows into the gas-liquid separator; and in the hot gas heating mode, refrigerant discharged from the compressor is introduced into the clearance from the outlet of the ejector, and flows into the interior heat exchanger through the low-pressure inlet port.

* * * * *